United States Patent [19]
Brown

[11] 3,802,719

[45] Apr. 9, 1974

[54] INFLATABLE SAFETY APPARATUS FOR VEHICLE OCCUPANT

[75] Inventor: Robert G. Brown, Pepper Pike, Ohio

[73] Assignee: Eaton Yale & Towne Inc., Cleveland, Ohio

[22] Filed: Jan. 18, 1971

[21] Appl. No.: 107,072

[52] U.S. Cl. .................................. 280/150 AB
[51] Int. Cl. ............................................ B60r 21/10
[58] Field of Search ............... 280/150 AB; 244/121

[56] References Cited
UNITED STATES PATENTS

| | | | |
|---|---|---|---|
| 2,418,798 | 4/1947 | Whitmer | 244/121 |
| 3,582,107 | 6/1971 | Goetz et al. | 280/150 AB |
| 3,560,018 | 2/1971 | Goetz | 280/150 AB |
| 2,859,048 | 11/1958 | Munn | 280/150 SB |
| 3,614,127 | 10/1971 | Glance | 280/150 AB |
| 3,614,129 | 10/1971 | Sobkow | 280/150 AB |
| 3,451,693 | 6/1969 | Carey | 280/150 AB |

Primary Examiner—Kenneth H. Betts
Attorney, Agent, or Firm—Teagno & Toddy

[57] ABSTRACT

A safety apparatus for protecting an occupant of a vehicle includes an inflatable confinement means. The confinement means, when in an expanded condition, comprises a series of pressurized compartments located along the path of movement of an occupant of a vehicle during a collision so that relative movement between the occupant and the confinement means results in the occupant penetrating one or more of the series of compartments. There is a pressure differential between the compartments and the compartment which is first encountered by the occupant has the lowest pressure therein, and the compartments encountered thereafter have progressively higher pressures therein. As a result, the rate at which the occupant is decelerated by the confinement means is increased as the occupant penetrates into the confinement means. The confinement means may advantageously be made of a resiliently deformable material which is stretched upon inflation of the confinement means and applies an inward force to effect an expulsion of fluid from the confinement means through blow out patches associated with one or more of the compartments. This expulsion of fluid results in a rapid deflation of the confinement means after the collision.

4 Claims, 4 Drawing Figures

INVENTOR.
ROBERT G. BROWN
BY
Yount and Tarolli
ATTORNEYS

INVENTOR.
ROBERT G. BROWN 3,802,719

INFLATABLE SAFETY APPARATUS FOR VEHICLE OCCUPANT

The present invention relates generally to a vehicle safety apparatus and, more particularly, to a vehicle safety apparatus which includes a confinement having a series of compartments one or more of which may be penetrated by an occupant of a vehicle during a collision to thereby restrain the occupant against movement resulting from the collision.

A known vehicle safety apparatus includes a confinement having a single, relatively large compartment for holding fluid under pressure. Upon the occurrence of a collision, the confinement is inflated and the movement of an occupant of the vehicle forwardly into the confinement, under the influence of collision forces, is restrained by fluid pressure within the confinement. Since the vehicle will be occupied by individuals of greatly varying sizes and weights, the problems of providing a confinement which is capable of effectively restraining the movement of both relatively small lightweight individuals and relatively large heavyweight individuals are great. The main problem is that of providing sufficient pressure for restraining a relatively large heavyweight individual during a major collision and yet sufficiently minimizing rebound of a relatively small lightweight individual during a collision. More specifically, a relatively high pressure acting on the heavyweight individual for a time interval, during which the heavyweight individual moves through a distance, is necessary to restrain the heavyweight occupant prior to engaging a structural part of the vehicle. On the other hand, a relatively low pressure is required to cushion a lightweight individual without rebound.

Accordingly, it is an object of this invention to provide a new and improved safety apparatus including an inflatable confinement which is satisfactory for restraining the movement of both relatively small, lightweight individuals with a minimum of rebound and yet provides sufficient pressure to effectively restrain relatively large, heavyweight individuals during a collision.

Another object of this invention is to provide a new and improved safety apparatus including an expandable confinement having a collapsed inoperative condition and an expanded operative condition and a means for inflating the confinement upon the occurrence of a collision wherein the confinement comprises a series of pressurized compartments located along the path of movement of the occupant of the vehicle during a collision and having a pressure differential between the compartments with the compartment first encountered by the occupant having the lowest pressure therein and the compartments in sequence thereafter having progressively higher pressures, whereby the force by which the occupant is decelerated is increased as the depth of penetration of the occupant into the confinement is increased.

Still another object of this invention is to provide a new and improved safety apparatus including a confinement having a collapsed inoperative condition and an operative condition to which the confinement is expanded by fluid flow from a suitable fluid supply and in which the confinement is effective to restrain movement of an occupant of the vehicle during a collision, the confinement including two or more compartments spaced so as to be penetrated by the occupant and a flow control means for providing a pressure differential between the compartments while fluid is flowing into the compartments with the pressure in the compartment closest to the occupant being the lowest and the pressure in each compartment in sequence thereafter being progressively greater whereby the force by which the occupant is decelerated is increased as the depth of penetration of the occupant into the confinement is increased while fluid is flowing into the confinement.

Another object of this invention is to provide a new and improved safety apparatus for protecting an occupant of the vehicle wherein the safety apparatus comprises a confinement means having a collapsed condition and an expanded condition in which the confinement means is effective to restrain movement of an occupant of the vehicle, and pressure-responsive means for enabling fluid to escape from the confinement means after the confinement means has been inflated to a predetermined pressure, the confinement means being formed of a resilient material which is stretched to such an extent by inflation of the confinement means to the expanded condition as to effect a deflation of the confinement means from the expanded condition to a condition in which the volume of the confinement means is less than 25 percent of the volume of the confinement means in the expanded condition within less than 0.30 of a second after said confinement means is inflated to said predetermined pressure and the flow of fluid for inflating the confinement means is stopped.

These and other objects and features of the invention will become more apparent upon a consideration of the following description taken in connection with the accompanying drawing wherein.

The present invention provides an improved vehicle safety apparatus for protecting an occupant of a vehicle during a collision. The vehicle safety apparatus includes a confinement having a series of compartments. Upon the occurrence of a collision, the compartments are inflated in such a manner as to provide a pressure differential between the compartments. The pressure in the compartment closest to the occupant is the lowest with progressively increasing pressure in the compartments thereafter. Therefore, the confinement is effective to exert a progressively increasing restraining effect on the occupant of the vehicle as the depth of penetration of the occupant into the confinement increases.

Figure 1:
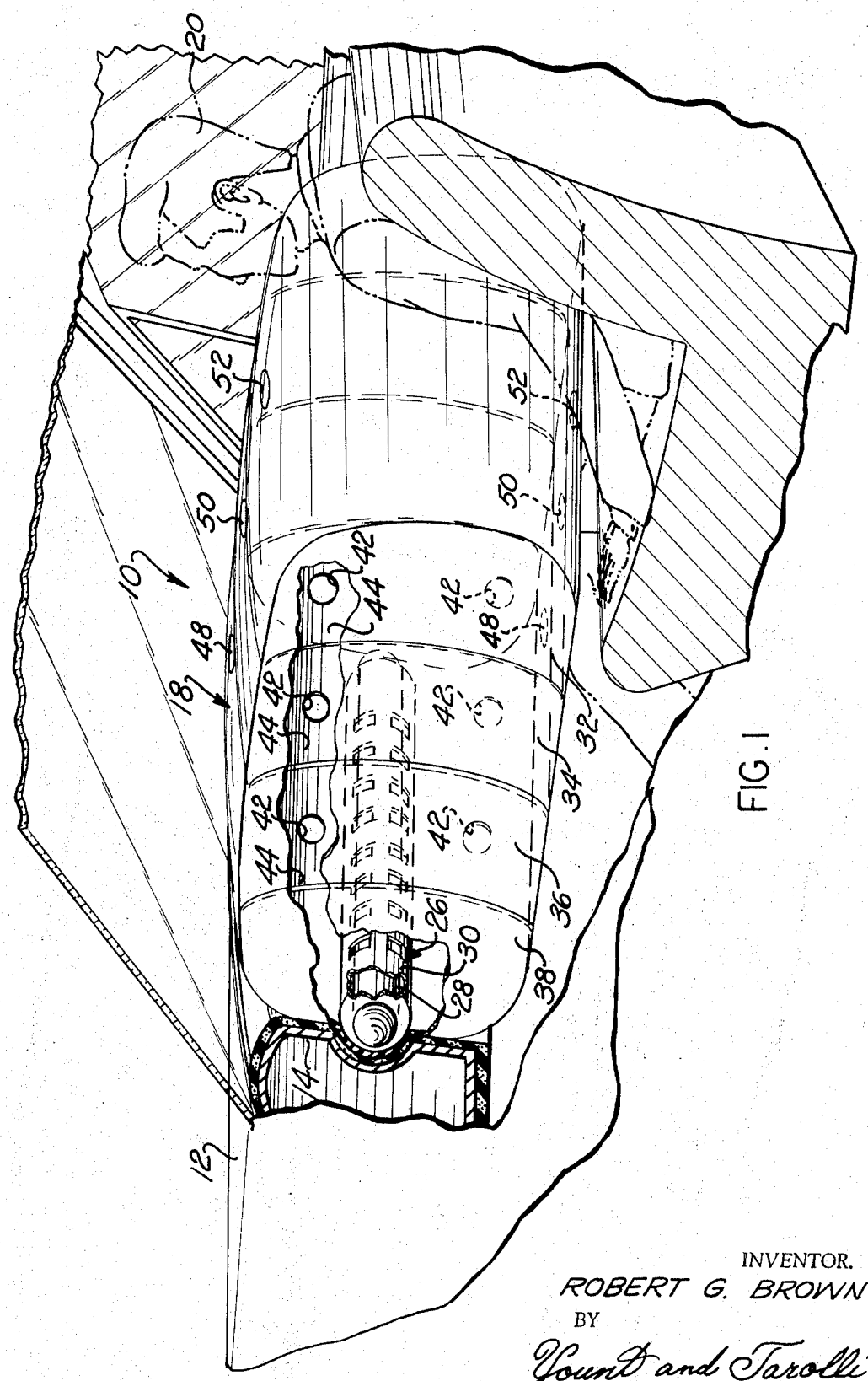
FIG. 1 is a schematic perspective view of a vehicle safety apparatus including a confinement constructed in accordance with the present invention: the confinement is illustrated in an expanded condition wherein the confinement is operative to restrain the movement of an occupant of a vehicle during a collision.

The vehicle safety apparatus embodying the present invention may be utilized in vehicles of different types, such as airplanes, automobiles, and trucks. As representing the preferred embodiment of the present invention, a vehicle safety apparatus 10 is illustrated in FIG. 1 in association with an automotive vehicle 12. The vehicle safety apparatus 10 may be associated with different parts of the automotive vehicle 12 and may be mounted in back of the front seat or in various locations in the automotive vehicle. As illustrated, the vehicle safety apparatus 10 is located on the dashboard 14 of the automotive vehicle 12.

The vehicle safety apparatus 10 includes a confinement 18 which is inflated from a collapsed inoperative condition or position (not shown), in which the confinement 18 is compactly arranged on the dashboard 14, to an expanded operative condition (shown in FIG. 1) upon the occurrence of a collision. The inflated confinement is operative to restrain movement of an occupant 20 of the vehicle 12 during the collision to thereby protect the occupant 20 against engagement with the windshield 22 or other part of the vehicle. The confinement 18 is inflated from the collapsed condition to the expanded condition by a flow of fluid from an inflation assembly 26 which is located within the confinement 18.

The inflation assembly 26 includes a source of fluid under pressure, in the present instance a reservoir 28. Upon the occurrence of a collision, the reservoir 28 is opened and a diffuser 30 directs the flow of fluid to thereby inflate the confinement. When in the expanded condition, the confinement 18 has a generally polygonal shape, as shown in FIG. 1, with the axis of the inflated confinement extending generally parallel to the dashboard 14 of the vehicle 12 and to the front seat of the vehicle upon which the occupant 20 is seated. The confinement 18 has a length which is substantially equal to the distance between the steering wheel of the vehicle and the door on the passengers' side of the vehicle so as to extend across the front seat of the vehicle. In view of its size, the confinement 18 operates during a collision to restrain the movement of a plurality of passengers seated on the front seat of the vehicle 12.

In accordance with the present invention, the confinement 18 includes a series of compartments or sections 32, 34, 36 and 38 which are positioned on a path along which the occupant 20 may move during a collision. The compartments 32 to 38 are inflated by fluid flow from the inflation assembly 26. While fluid flows into the confinement 18, a relatively high pressure is provided in the compartment 38, a somewhat lower pressure in the compartment 36, a still lower pressure in compartment 34 and the lowest pressure in the compartment 32. The pressure differential between the compartments 32 to 38 enables the confinement 18 to be effective during a collision to restrain the forward movement of occupants having substantially different weights. This is because the restraining effect of the confinement 18 increases as the depth of penetration of the occupant into the confinement increases due to the increasing pressure in compartments 32 to 38 in the direction of movement of the occupant.

Figure 2:
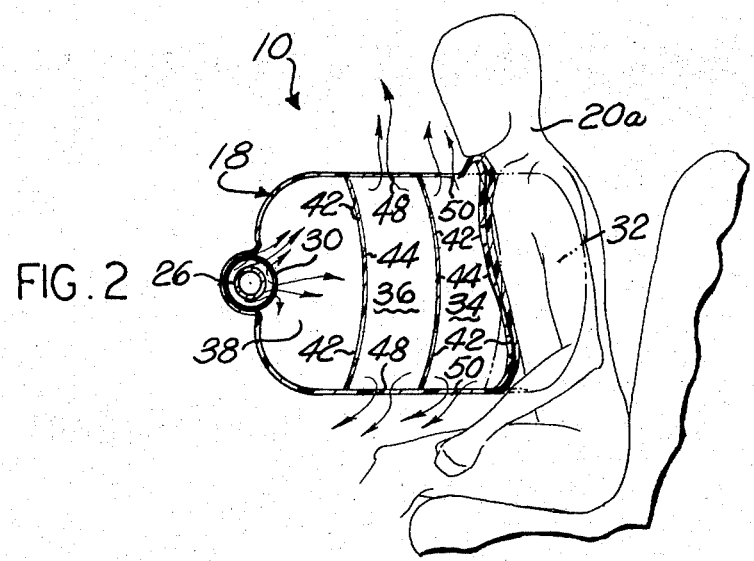
FIG. 2 is a schematic illustration, on a reduced scale, depicting the restraining of the movement of a relatively lightweight individual during a collision, by the confinement of FIG. 1.
Figure 3:
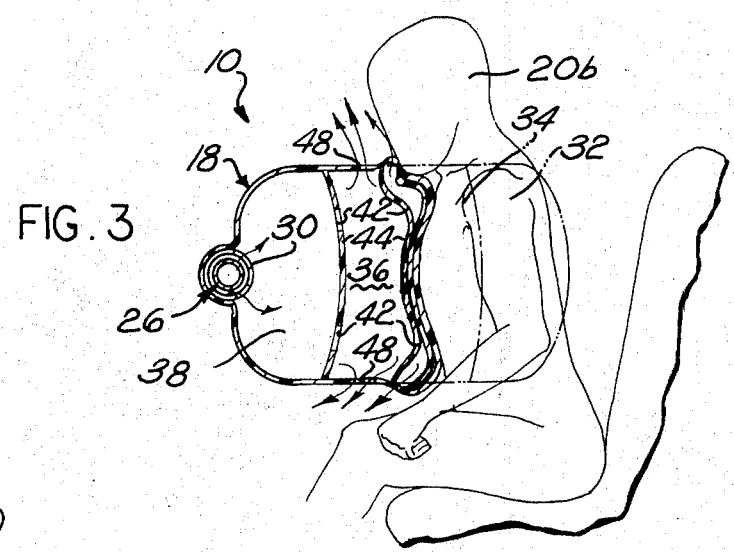
FIG. 3 is a schematic illustration, on a reduced scale, depicting the restraining of the movement of a medium-weight individual during a collision, by the confinement of FIG. 1.
Figure 4:
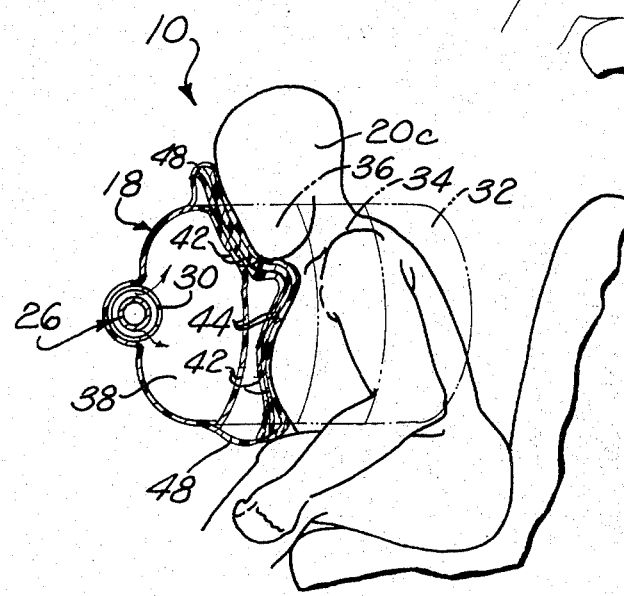
FIG. 4 is a schematic illustration, on a reduced scale, depicting the restraining of the movement of a relatively heavyweight individual during a collision, by the confinement of FIG. 1.

The increasing restraining effect and deceleration of an occupant of the vehicle 12 by the confinement 18 with increasing penetration of the occupant into the confinement is perhaps best seen by a comparison of FIGS. 2-4. In FIG. 2, the relationship of a relatively small occupant 20a to the confinement 18 during a major collision is illustrated. Due to his relatively light weight, the occupant 20a moves forwardly into the confinement 18 under the effect of collision forces with a relatively small impact force on the confinement. Therefore, the occupant 20a is decelerated and his forward movement is effectively restrained by the relatively low fluid pressure in two rearward compartments 32 and 34. It should be noted that the impact of the lightweight occupant 20a against the confinement 18 is large enough to collapse only the low pressure compartment 32 from its expanded position shown in dashed lines in FIG. 2. Since a low pressure acts to restrain the lightweight occupant, there is less tendency for rebound than if a high pressure restrained the lightweight occupant.

The relationship of a somewhat larger or medium weight occupant 20b and the confinement 18, during a major collision, is illustrated in FIG. 3. Due to his greater weight, the occupant 20b penetrates further into the confinement 18 and is subjected to somewhat larger deceleration and restraining effects by the fluid pressure within the compartments 32, 34 and 36. The larger impact of the heavier occupant 20b against the confinement 18 is sufficient to collapse the compartments 32 and 34 from their expanded positions, shown in dashed lines in FIG. 3.

Finally, the relationship between a relatively heavyweight occupant 20c and the confinement 18 during a major collision of the same magnitude as that to which the occupants 20a and 20b were subjected, is illustrated in FIG. 4. Before his forward movement is arrested, the heavyweight occupant 20c penetrates further into the confinement 18 than did either of the occupants 20a or 20b. Thus, the compartments 32, 34 and 36 are substantially collapsed by the forward impact of the occupant 20c against the confinement 18.

In view of the preceding comparison, it can be seen that the confinement 18 is effective to protect occupants of different weights during a collision. This is because the depth of penetration of the occupant into the confinement 18 varies as a direction function of the weight of the occupant, and the greater the penetration of the occupant into the confinement, the greater is the fluid pressure restraining movement of the occupant. Of course, the deceleration and restraining effect of the confinement 18 on the occupant progressively increases as the fluid pressure in the compartments penetrated by the occupant increases. However, this tends to provide a progressively increasing restraining force rather than an abrupt increase in restraining force. Although the foregoing comparison describes how a particular occupant may penetrate the confinement in a sequential manner under the influence of collision forces, it should be understood that a particular occupant, under the influence of a specific collision, could conceivably penetrate the confinement and be supported by one or more of the compartments in a manner other than the described sequential manner.

In order to provide the afore-mentioned pressure differential between the compartments 32 to 38, the flow of fluid into the compartments is controlled. While the controlled flow of fluid could be obtained by connecting the compartments with the inflation assembly 26 through conduits of different sizes or by providing a different source of fluid for each compartment, orifices or apertures 42 are advantageously formed in panels 44 separating the compartments (see FIG. 1) to control the flow of fluid in a relatively simple manner. The orifices 42 provide the pressure differential between the compartments 32 to 38 by restricting the flow of fluid between the compartments. Although orifices 42 are shown and described in this description of the preferred embodiment, it should be noted that these openings may be covered by a porous fabric material or the like. In that case, it may also be desirable to utilize fabric material coverings having a different density of weave or thread count per inch over the various orifices associated with the various compartments of said confinement in order to more readily provide for staging of the pressures in the various compartments.

Upon the occurrence of a collision, the forwardmost compartment 38 is quickly inflated to a relatively high pressure by a flow of fluid from the inflation assembly 26 which is located within the compartment 38. The orifices 42 between the compartments 36 and 38 restrict the flow of fluid from the compartment 36 so that during flow there is a pressure differential between compartment 38 and compartment 36. Therefore, at any given time during the inflation of the confinement 18, that is while fluid is flowing from the compartment 38 to the compartment 36, the pressure in the compartment 36 is somewhat less than the pressure in the compartment 38. Similarly, the orifices 42 which connect the compartment 34 in fluid communication with the compartment 36 restrict the flow of fluid from the compartment 36 to the compartment 34 to thereby provide a somewhat lower pressure in the compartment 34, during the inflation of the confinement 18, than is present in the compartment 36. Finally, the orifices 42 in the panel 44 separating the compartments 32 and 34 restrict the flow of fluid from the compartment 34 to the compartment 32 so that the compartment 32 has the lowest pressure of the series of compartments at any given time during the inflation of the confinement 18.

When the occupant 20 moves forwardly under the influence of collision forces, into engagement with the confinement 18 while the fluid is flowing through the orifices 42 between the compartments 32 to 38, the relatively low pressure in the compartment 32 subjects the occupant 20 (see FIG. 1) to a relatively low deceleration or restraining effect. As the depth of penetration of the occupant 20 into the confinement 18 increases, the occupant penetrates the compartment 34 in which there is a higher fluid pressure so that the rate of deceleration and restraining effect is increased. Similarly, the restraining effect of the confinement 18 on the occupant 20 is increased as the occupant penetrates through the compartment 34 into the compartment 36 in which there is a still higher fluid pressure. If a relatively heavy occupant, similar to the occupant 20c of FIG. 4, is subjected to a major collision, the restraining effect of the compartments 32 to 36 may be insufficient to completely stop the forward movement of the occupant. The occupant is then effectively restrained by the relatively high pressure in the forwardmost compartment 38.

From the above, it should be apparent that the fluid supply, whether it be a compressed gas, a gas generator, or the like, must be sufficient to provide a flow for a time interval during which the occupant is moving forwardly. After the flow terminates, there is a tendency toward pressure equalization in all of the compartments To minimize rebound of all of the occupants from the confinement 18 and to provide for a deflation of the confinement after a collision, pressure-responsive blowout assemblies 48, 50 and 52 are associated with the compartments 32, 34 and 36, respectively. The blowout assemblies 48 to 52 include patches or segments which are blown or forced out of the top and bottom walls of the confinement 18 by fluid pressure within the compartments 32, 34 and 36. Thus, when the pressure within within the compartment 36 reaches a predetermined amount, the blowout assemblies 48 in the top and bottom walls or sections of the compartment 36 operate to provide exhaust apertures through which fluid will flow out of the compartment 36. Similarly, blowout assemblies 50 and 52 operate to exhaust the associated compartments 32 and 34 when a predetermined pressure is reached therein.

It is contemplated that the blowout assemblies 48, 50 and 52 could, if desired, be made responsive to different pressures so that the blowout assembly 48 associated with the compartment 36 will operate at a first relatively high pressure and the blow-out assemblies 50 associated with the compartment 34 will be operated at a somewhat lower pressure to thereby maintain the previously described pressure differential between the compartments 34 and 36. Similarly, the blow-out assemblies 52 could be constructed to operate at an even lower pressure to thereby facilitate the maintenance of a relatively low pressure in the compartment 32. While blow-out assemblies have been shown in association with only the compartments 32, 34 and 36, it should be understood that a blow-out assembly could also be associated with compartment 38. It should also be understood that blowout assemblies could be omitted from more than one of the compartments.

After a collision has occurred and the forward movement of the occupant 20 has been effectively restrained by the confinement 18, it may be necessary for the occupant 20 to quickly leave the vehicle 12 due to fire or other circumstances. To facilitate the exit of the occupant 20 from the vehicle 12, the confinement 18 is quickly deflated from the expanded condition shown in FIG. 1 to a collapsed or deflated condition wherein the confinement has a volume which is less than 25 percent of the volume of the confinement when it is in the expanded condition of FIG. 1. To promote this deflation of the confinement 18, the confinement is formed of a resiliently deformable or stretchable elastomeric material, such as synthetic rubber. The elastomeric material is stretched by the inflation of the confinement 18 from the collapsed condition in which the confinement is a compact unit on the dashboard 14 of the vehicle 12 to the expanded condition, shown in FIG. 1, by fluid pressure within the compartments 32 to 38. After the blowout assemblies 48 to 52 have operated and the flow of fluid from the inflation assembly 26 is stopped, the resiliently stretched material forming the confinement 18 exerts a positive inward pressure against the fluid within the compartments 32 to 38 to thereby tend to expel the fluid from the confinement 18 through the exhaust apertures formed by the operation of the blowout assemblies 48 to 52. This positive influence of the resilient material forming the confinement 18 brings the volume of the confinement to less than 25 percent of the volume in the expanded condition. Further deflation of the confinement occurs without the force provided by the resilient material. Thus, by forming the confinement 18 of a material which is resiliently stretched upon inflation of the confinement, the confinement is rapidly deflated after a collision to facilitate the leaving of the vehicle 12 by the occupants who were protected during the collision by the expanded confinement. However, it should be understood that the confinement could be constructed of a material which is not stretched to any substantial extent upon inflation of the confinement.

Although in the description of the preferred embodiment, an example of the material suitable for constructing the confinement is recited as being synthetic rubber, in view of recent developments in the area of fabric materials, the various compartments of the confinement could be made entirely of fabric materials and still achieve the aforementioned staging of pressures in the various compartments upon inflation thereof. In this case, it may also be desirable to vary the density of weave or elastic properties of the thread materials used for manufacturing the various compartments in order to most efficiently achieve staging of pressures therein upon inflation of said confinement. In view of the foregoing description, it can be seen that the present invention provides a safety apparatus 10 including a confinement 18 which is effective to restrain the movement of either a relatively lightweight or relatively heavyweight individual during a collision. This versatility of the confinement 18 results from the provision of a plurality of compartments 32 to 38 which are inflated in such a manner as to have a sequentially increasing pressure in the compartments in a direction along the path of movement of an occupant of the vehicle during a collision. Although the compartments 32 to 38 have been shown herein as being connected in fluid communication with each other and the inflation assembly 26 by the orifices 42, it should be understood that the compartments could receive fluid from the inflation assembly 26 through separate connections. The compartments 32 and 38 could also be expanded under the influence of fluid from a plurality of sources each of which is associated with a different one of the compartments.

Since the restraining effect of the compartments 32 to 38 is a direct function of the fluid pressure within the compartments, the further the occupant of the vehicle penetrates into the confinement 18, the greater is the restraining effect of the confinement 18 on the occupant. This progressively increasing restraining effect or deceleration of the occupant permits the confinement 18 to be used with individuals or different weights, since a relatively lightweight individual will penetrate for a relatively small distance into the confinement 18 and, therefore, be subjected to only a relatively small restraining effect which is suitable for such a lightweight individual. On the other hand, a relatively heavyweight individual will penetrate for a substantial distance into the confinement 18 and be subjected to a relatively large restraining effect which is necessary to adequately protect such a heavyweight individual during a collision. The confinement 18 is advantageously made of a resiliently deformable or stretchable material which will effect a rapid deflation of the confinement to a relatively small volume, that is, a deflation of the confinement in 0.30 seconds or less to a volume of less than 25 percent of the volume of the expanded confinement.

Having described my invention, I claim:

1. Safety apparatus for protecting an occupant of a vehicle, said safety apparatus comprising an expandable confinement means having a collapsed inoperative condition and an expanded operative condition, said confinement means when in said expanded operative condition being effective to restrain movement of an occupant of the vehicle during a collision, said confinement means comprising a series of pressurized compartments located adjacent to each other along the path of movement of the occupant of the vehicle during a collision so that relative movement between the occupant and said confinement means results in said occupant penetrating at least one of the compartments of said series of compartments, and means for providing a flow of fluid for inflating said compartments, the improvement wherein:

at least two of said series of compartments each have a pressure responsive assembly associated therewith for enabling fluid to flow out of the associated compartment upon the occurrence of a respective predetermined pressure within the associated compartment, said pressure responsive assemblies being operable to exhaust fluid at different pressures to provide a variable restraining force on said occupant as said occupant sequentially penetrates said compartments, and said confinement means is made of a resilient material which is stretched upon inflation of said confinement means, said confinement means being urged by said resilient material from said expanded operative condition toward a deflated condition to thereby effect an expulsion of fluid from said confinement means through said pressure responsive assemblies and thereby retract said confinement toward said inoperative condition upon termination of said fluid flow.

2. Safety apparatus as set forth in claim 1 wherein said resilient material is stretched to such an extent by inflation of said confinement to said expanded operative condition that said resilient material effects an expulsion of fluid through said exhaust means at a rate so as to deflate said confinement to a volume of less than twenty-five percent of the volume of said confinement in said expanded operative condition in less than three-tenths of a second after termination of fluid flow.

3. Safety apparatus for protecting an occupant of a vehicle, said safety apparatus comprising an expandable confinement having a collapsed inoperative condition and an expanded operative condition, said confinement when in said expanded operative condition being effective to restrain movement of an occupant of the vehicle during a collision, said confinement including a series of compartments which are at least partially defined by a series of panels, means for supplying a flow of fluid connected in fluid communication with said confinement for expanding said confinement upon the occurrence of a collision, flow control means for regulating the flow of fluid between said compartments to provide a pressure differential between said compartments while fluid is flowing into said compartments with the pressure in the one of said series of compartments which is furthest from the occupant being the highest and the pressure in each compartment in sequence thereafter progressively less, said flow control means including orifice means formed in said panels for enabling fluid to flow between said compartments at a rate which is lower than the rate of fluid flow from said means for supplying a flow of fluid to provide said pressure differential between said compartments while fluid is flowing into said confinement, whereby the rate at which the occupant is decelerated by the confinement is increased as the depth of penetration of the occupant into the confinement is increased while fluid is flowing into the confinement, and a series of exhaust means each of which is associated with one of said compartments for enabling fluid to escape from the associated one of said compartments when a predetermined fluid pressure is present in the associated compartment to thereby tend to minimize rebound of the occupant from the confinement, at least two of said exhaust means being operable to exhaust fluid in response to different fluid pressures to provide a restraining force on said occupant which varies as said occupant serially engages said compartments, said confinement being made of a resilient material which is stretched upon inflation of said confinement to said expanded operative condition to thereby provide for positive expulsion of fluid from said compartments through said exhaust means under the influence of the force applied by said resilient material whereby said confinement means is retracted toward the inoperative position upon termination of fluid flow.

4. Safety apparatus as set forth in claim 3 wherein said resilient material is stretched to such an extent by inflation of said confinement to said expanded operative condition that said resilient material effects an expulsion of fluid through said exhaust means at a rate so as to deflate said confinement to a volume of less than twenty-five percent of the volume of said confinement in said expanded operative condition in less than three-tenths of a second after termination of fluid flow.

* * * * *

UNITED STATES PATENT OFFICE
CERTIFICATE OF CORRECTION

Patent No. 3,802,719　　　　　　　　　　Dated　　April 9, 1974

Inventor(s)　　　　Robert G. Brown

It is certified that error appears in the above-identified patent and that said Letters Patent are hereby corrected as shown below:

Column 4, line 43, "direction" should read -- direct --.

Column 7, line 53, "or" should read -- of --.

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents